United States Patent
Waddicor

[15] 3,659,169
[45] Apr. 25, 1972

[54] MOTOR SPEED CONTROL USING A COUNTDOWN COUNTER

[72] Inventor: Andrew Hurlstone Waddicor, Lower Lodge, Almondsbury, Gloucestershire, England

[22] Filed: Oct. 9, 1970

[21] Appl. No.: 79,672

Related U.S. Application Data

[63] Continuation of Ser. No. 729,958, May 17, 1968, abandoned.

[52] U.S. Cl. ........................................................... 318/341
[51] Int. Cl. ........................................................... H02p 5/16
[58] Field of Search ............... 318/138, 341, 345, 318, 314, 318/603; 307/225, 271

[56] References Cited

UNITED STATES PATENTS

| | | |
|---|---|---|
| 3,414,785 | 12/1968 | Orahood ........................... 318/345 |
| 3,176,208 | 3/1965 | Gifft ................................. 318/318 |
| 3,349,308 | 10/1967 | Strand .............................. 318/314 |
| 3,408,549 | 10/1968 | Shimabukuro .................... 318/318 |

Primary Examiner—Bernard A. Gilheany
Assistant Examiner—Thomas Langer
Attorney—Mawhinney & Mawhinney

[57] ABSTRACT

The speed of a hysterisis induction motor is controlled by eliminating selected pulses from the alternating current supply by loading a count-down register at regular intervals with a binary number, the register being connected to establish the current supply to the motor for so long as a number is present in the register. The pulses of the current so established are used to count down the register so that the supply is cut-off when the number reaches zero. The number determines the duration of the supply between successive loadings of the register and the speed is thus determined by the magnitude of the number.

6 Claims, 3 Drawing Figures

MOTOR SPEED CONTROL USING A COUNTDOWN COUNTER

This application is a continuation of application Ser. No. 729,958 filed May 17, 1968, now abandoned.

This invention relates to controlling electric motors.

It is an object of this invention to provide an induction motor with a speed control system in which the speed of the motor can be determined by selection of a number.

It is also an object of this invention to provide an induction motor with a control system in which the speed of the motor can be varied by a computer varying a number.

According to this invention there is provided, in combination, an induction motor including a rotor and a stator having a control winding, a source of alternating current, means for repeatedly generating a start signal at time intervals of sufficient length to include a plurality of cycles of said current, means for counting the cycles, means responsive to the start signal for initiating the count by the latter means, means responsive to the start signal for establishing a connection between said source and said control winding, means responsive to a predetermined terminal count being reached for terminating the count, means for producing a stop signal in response to termination of the count, means responsive to the stop signal for disestablishing said connection, and means for selectively predetermining the terminal count thereby to determine the speed of the motor, said intervals being sufficiently short and said count being sufficiently large so that in operation the motor is rotated continuously.

An example of a system according to this invention will now be described with reference to the accompanying drawings wherein.

Figure 1:
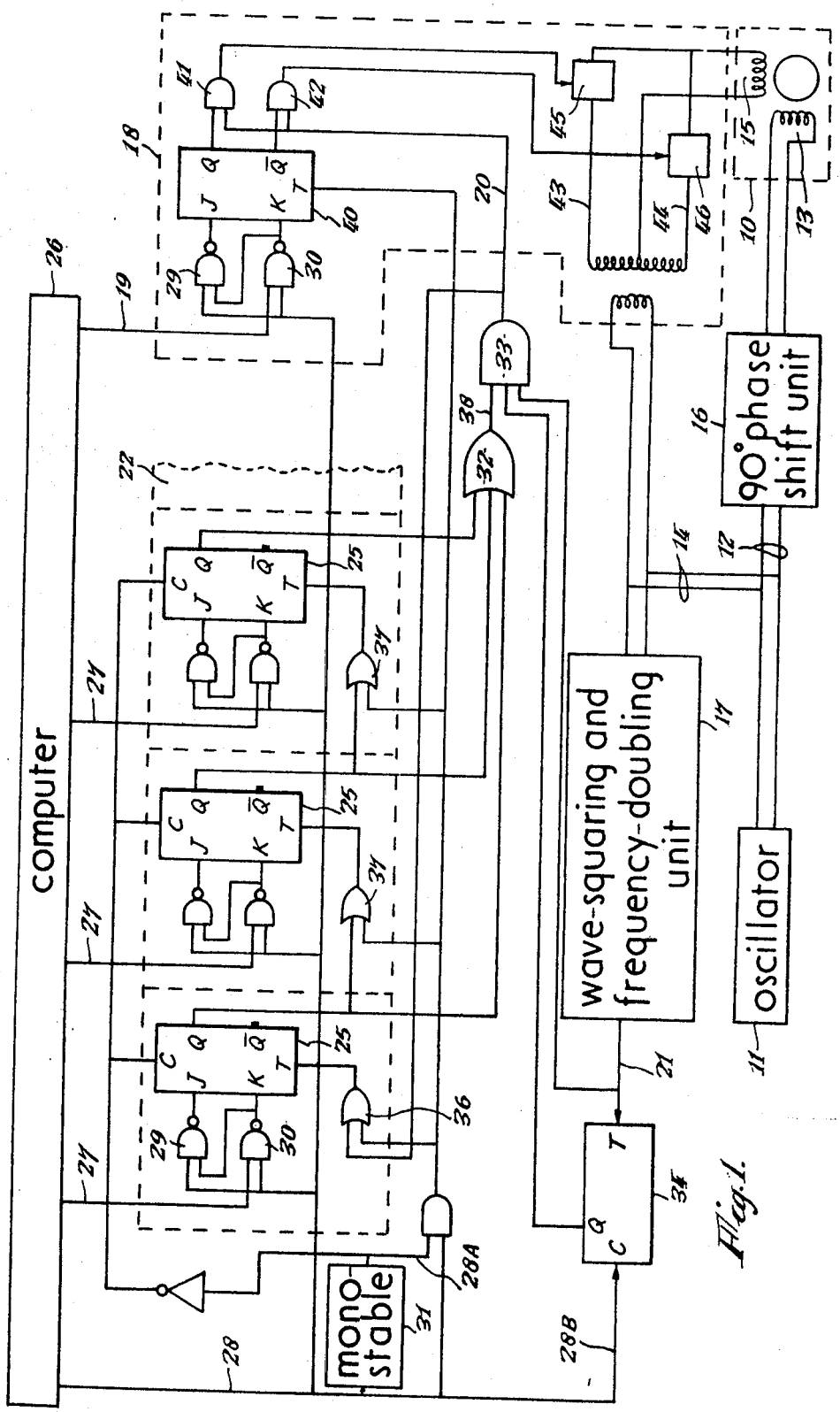
FIG. 1 is a logic diagram of the system.
Figure 2:
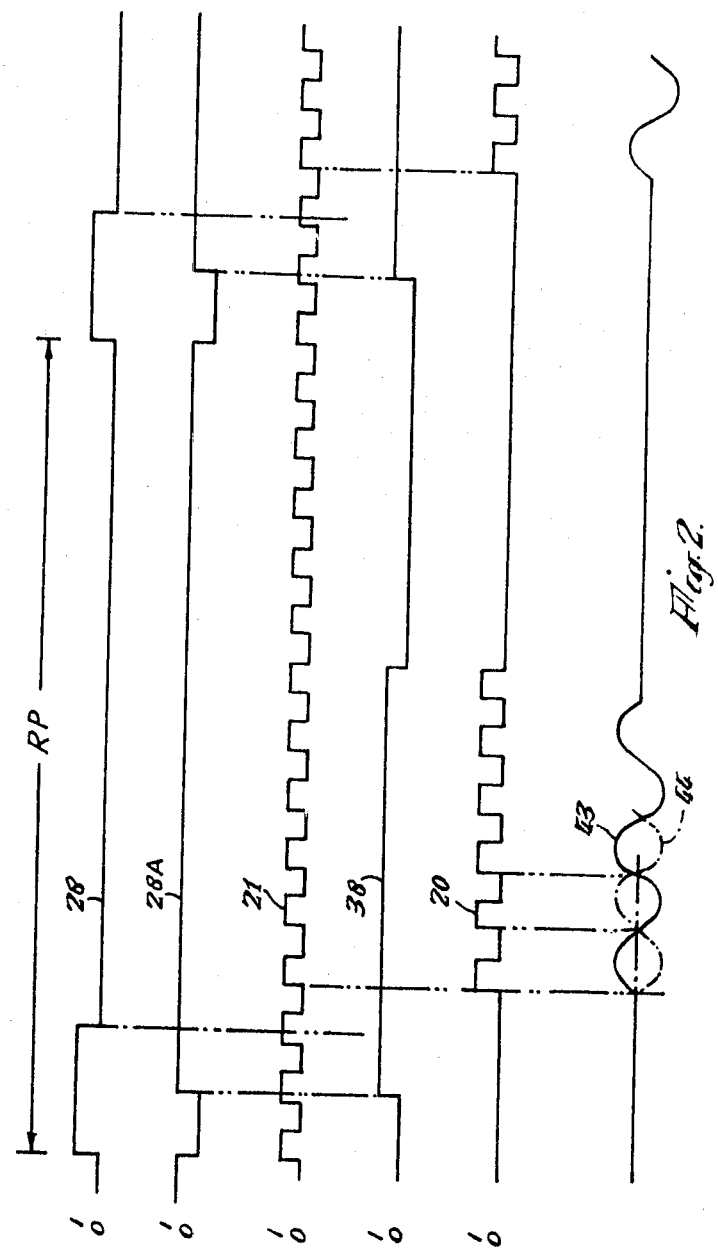
FIG. 2 is a wave diagram of signals described with reference to FIG. 1.

Referring to FIGS. 1, 2 the system is constructed as follows. A two-phase hysterisis induction motor 10 is adapted to be driven by a 400 HZ alternating current of sinusoidal wave form produced by an oscillator 11. The output of the oscillator 11 has a branch 12 connected to a reference winding 13 of the motor through a 90° phase shift unit 16 known per se. The oscillator output has a further branch 14 connected to a control winding 15 of the motor through a direction control unit 18 through which a direction control signal 19 and a speed control signal 20 are adapted to control the direction and speed of rotation of the motor. The branch 14 is also connected through a wave squaring and frequency doubling unit 17, known per se, to produce an operating signal 21 for use in the operation of the unit 18 and in the operation of a register 22.

The register 22 comprises a series of identical flip-flops 25 well-known per se and each having two outputs Q, $\overline{Q}$, a clearing input C, a toggle input T and two control inputs J, K, all related as follows:

| | |
|---|---|
| If C = "1" | then Q = "0" and $\overline{Q}$ = "1." |
| If J ≠ K | then Q = J and $\overline{Q}$ = K, provided T = "1." |
| If T = "1" | then Q and $\overline{Q}$ reverse, provided J = K = "1." |
| If J ≠ K = "0" | then T is not effective. |

The register 22 is connected to a computer 26 adapted to generate binary control numbers whose digits are fed in parallel on data lines 27 to the respective flip-flops 25. Each control number defines a speed at which the motor 10 is to run and it is from this number that the speed control signal 20 is derived. As will be described, the control number is loaded into the register by means of a start signal 28 also generated by the computer. The presence in the register of any number greater than zero causes the motor to run and simoultaneously causes the register to be counted down by one digit per pulse of the current supplied to the motor so that when the register is at zero the supply to the motor is stopped. A "pulse" is understood to be a half-cycle of the oscillator output. The time between successive starting signals is referred to as the "repeat period." If the control number is equal to or greater than the number of pulses possible in one repeat period then the motor runs at its maximum possible speed. If the control number is smaller than the number of pulses giving that maximum speed, then the motor runs at a correspondingly reduced speed. A typical figure for the repeat period is 50 msec. The 400 HZ supply from the oscillator produces 800 pulses per second so that for a repeat period of 50 msecs it is possible to have 40 pulses per repeat period, and a binary 101000 (decimal 40) on the register is sufficient to keep the motor running continuously while any binary number down to binary 1 produces a correspondingly reduced speed.

Referring now to the loading of the register, the signal on each data line 27 is introduced to its associated flip-flop 25 through two AND gates 29, 30 whose outputs are connected to the inputs J and K respectively of the flip-flop. The signal 28 is connected directly to the AND gates 29, 30 to enable them to transmit any "1" present on the line 27 to the inputs J, K. These inputs are both at "1" when the signal 28 is "0" and wherein the input K becomes "0" when the signal 28 changes to "1" while a "1" is present on the line 27. If a "0" is present on the line 27 while the signal 28 changes to "1" then the input J changes to "0" while K remains at "1." The signal 28 is further connected through a monostable 31 whose output signal 28A is connected to the input T of each flip-flop 25 whereby the signals on the inputs J, K are transferred to the outputs Q, $\overline{Q}$. The flip-flop is then said to be loaded. The delay produced by the monostable makes it possible for the signals on the inputs J, K to settle before being transferred to the outputs Q, $\overline{Q}$. Only the output Q is used, and it will be seen that on completion of the delay period through the monostable any "1" on the line 27 is transferred to the output "Q." This loading process is the same for all the flip-flops 25. The output signal 28A is also connected through an inverter to the input C of each flip-flop so that when the signal 28 changes from "0" to "1," i.e. at the beginning of the delay period of the monostable, the flip-flop is cleared, i.e. the output Q is set to "0."

The outputs Q of all the flip-flops 25 are connected through an OR gate 32 whose output, 38, is therefore "1" for so long as there is a "1" in the register 22. The output of the OR gate 32 is connected through an AND gate 33 whose output is the signal 20 which controls the actuation of the motor. The actual enabling of the signal 20 does not take place until the signal 28 has returned to "0" so as to provide a time for the outputs Q of the flip-flops 25 to settle, and the signal 20 is not enabled until the unit 17 has started on the first pulse following the return of the signal 28 to "0" so as to avoid the condition of including a partial pulse in the count-down of the register 22. To this end the AND gate 33 has an input from an output Q of a flip-flop 34, which output Q is held at "0" by a connection 28B to the signal 28 so that the output Q cannot rise to "1" until the signal 28 goes to "0" and the flip-flop 34 has an input T connected to the signal 21 from the unit 17 so that the output Q changes from "0" to "1" only when the signal 21 changes from "0" to "1." The duration of the "1" condition of the signal 28 is determined by the computer.

Referring now to the count-down of the register 22, it is clear that the count-down commences simultaneously with the enabling, i.e. the first change from "0" to "1," of the signal 20. To initiate the count-down the signal 20 is connected to the input T of the first flip-flop 25, i.e. the flip-flop defining the least significant digit of the control number. The connection to the latter input is through an OR gate 36 with the signal 28 as shown. Further each output Q of the flip-flops 25 is connected to the input T of any next succeeding flip-flop 25 through an OR gate 37 with the signal 28. Thus the occurrance of a "0" to "1" transition of the signal 20 reverses the output "Q" of the first flip-flop 25, and when any such transition of the signal 20 changes that output Q back from "0" to "1" the action on the input T of the next flip-flop 25 causes the output Q of that flip-flop to reverse. In this way the register is counted down and the signal 20 finally remains at "0" when the last "1" has disappeared from the register.

The signal 20 acts on the motor through the direction control unit 18 fed by the direction control signal 19 which is generated by the computer and which is "0" and "1" respectively for the forward and the reverse directions of motion of the motor. The signal 19 is connected to a flip-flop 40 having an output $\overline{Q}$ which changes from "0" to "1" when the signal 19 calls for reverse direction of rotation, the flip-flop further having an output Q which changes from "0" to "1" when the signal 19 calls for the forward mode. The flip-flop 40 is constructed in the same manner as the flip-flops 25 and has similar gating 29, 30 and a connection from the signal 28A for the purposes of loading the flip-flop 40. The outputs Q, $\overline{Q}$ of the flip-flop 40 are connected through AND gates 41, 42 which each have an input from the signal 20 so that the outputs of these AND gate are enabled when the signal 20 is enabled. The supply on the branch 14 is taken through a transformer 47 having outputs 43, 44 which are 180° out of phase and which are alternatively connectable to one terminal of the winding 15, the other terminal of the winding being connected as shown to a common centre tapping of the transformer output winding. The outputs 43, 44, being 180° out of phase, are respectively capable of driving the motor in the reverse and the forward direction. The output 43 is enabled by a semiconductor power switch 45, e.g. a bi-directional SCR, triggered by the output of the AND gate 41 while the output 44 is enabled by a like switch 46 triggered by the output of the AND gate 42.

FIG. 2 shows one of the repeat periods denoted RP. As shown, the signal 20 ceases, i.e. remains at "0" before the start of the next repeat period. It is to be understood that the frequency of the repeat periods is sufficiently high in relation to the inertia of the motor that the motor does not stop between the cessation of the signal 20 and the start of the signal 28. The speed of the motor is to be regarded as the mean of the speed fluctuations produced by the cessation of the signal 20 before the end of the repeat period.

It will be seen that, since the signal 21 has twice the frequency of the supply, it is possible to determine the duration of the supply to the motor in each repeat period to the nearest half cycle of the supply. It is also a consequence of the use of the frequency-doubling unit 17 that the full wave of the supply becomes available to the motor though the supply is counted down in pulses corresponding to half-cycles of the supply.

In a modification, not illustrated, the frequency doubling means are not used. Thereby the rate of count-down is halved and the control number must be correspondingly half the value of the number used with frequency doubling. However, the resolution, i.e. the accuracy of the speed control, is inferior and the motor cannot be driven by a full wave but only by a half-wave signal to the winding 15. It is nevertheless possible to use this modified form of the invention, and the expression "a motor rotatable by alternating current" includes a motor rotatable by current of any wave form not necessarily sinusoidal, e.g. a succession of half-waves.

Figure 3:
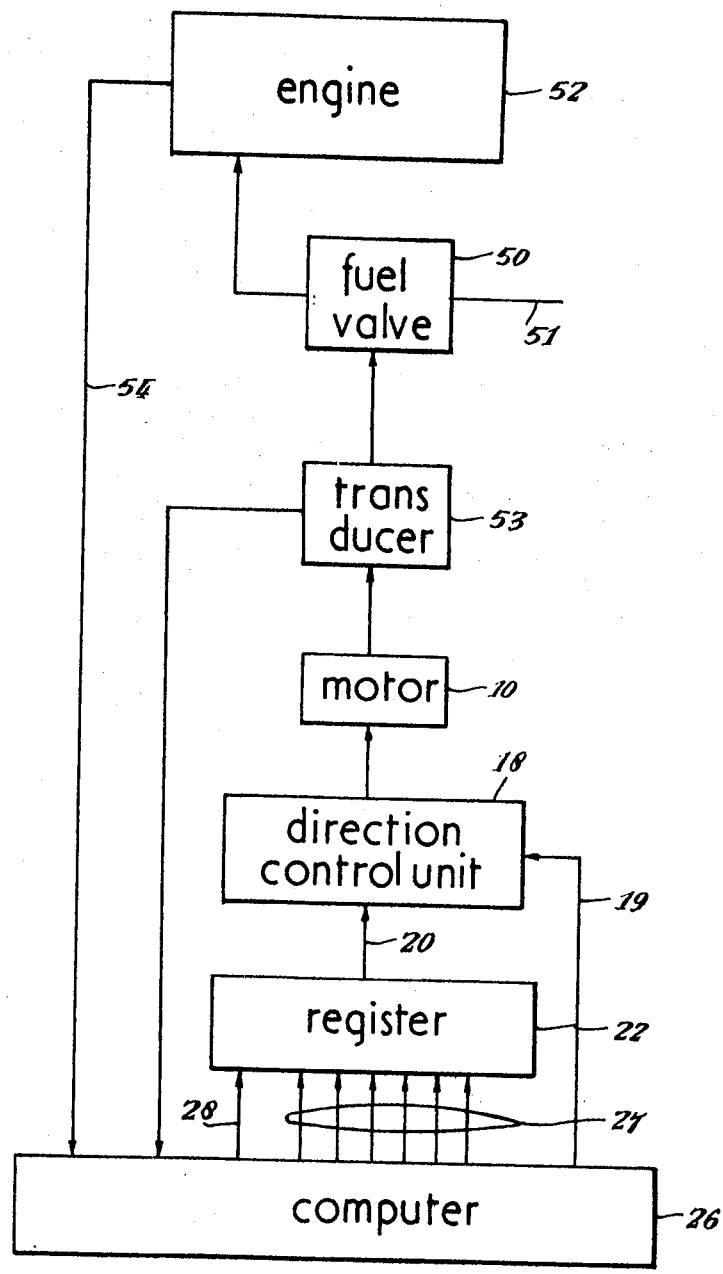
FIG. 3 is a block diagram of a plant using the system.

Referring to FIG. 3, the computer 26 is shown as connected by the register 22 and unit 18 to the motor 10, the motor being adapted to drive a fuel control valve 50 in a fuel supply duct 51 to a gas turbine engine 52. The motor position is fed back from a position transducer 53 to the computer. It will be seen that the speed control signal 20 controls the speed of opening or closing of the valve, and the computer controls the position to which the valve is set simply by providing a control number. When the control number is zero the motor stops and when the control number is greater than zero the valve is driven at the speed determined by the value of the control number. The computer can stop or start the motor at any time simply by making the control number zero or non-zero whether in response to the feedback signal 53 or otherwise, e.g. in response to a feedback signal 54 signifying the speed of the engine.

In the example of the system described with reference to FIGS. 1, 2, the motor may have four poles per phase and a maximum speed of 12,000 r.p.m. This means that the motor makes nominally a quarter of a revolution for each pulse 20, or at 20 repeat periods per second one pulse 20 produces a nominal speed of 300 r.p.m. of the motor, 40 such pulses per repeat period resulting in the full 12,000 r.p.m. of the motor.

I claim:

1. In combination, an induction motor including a rotor and a stator having a control winding, a source of alternating current, means for repeatedly generating a start signal at time intervals of sufficient length to include a plurality of cycles of said current, means for counting the cycles, means responsive to the start signal for performing a count by the latter means, means responsive to the start signal for establishing a connection between said source and said control winding, means responsive to a predetermined terminal count being reached for terminating the count, means for producing a stop signal in response to termination of the count, means responsive to the stop signal for disestablishing said connection, and means for selectively predetermining the terminal count thereby to determine the speed of the motor, said intervals being sufficiently short and said count being sufficiently large so that in operation the motor is rotated continuously.

2. In combination, a source of alternating current, a computer adapted to produce binary numbers at time intervals of sufficient length as to include a plurality of cycles of the current, a count-down counter connected to the computer to be set to the number produced by the computer at the commencement of each such time interval, gating means responsive to the presence of a non-zero number in the counter to establish connection between said source and the counter for the pulses defined by the alternation to cause said count-down, means responsive to the attainment of the zero count to inhibit further counting, an induction motor having a control winding and a rotor, gating means responsive to the presence of a non-zero number in the counter to establish connection between said source and said control winding to cause rotation of the rotor, wherein the said time intervals are sufficiently short and the length of said count is sufficiently large in relation to the inertia of the rotor so that in operation the rotor rotates continuously and the speed of the motor is variable by variation of said number.

3. In combination, a source of alternating current, a computer adapted to produce a plurality of parallel output signals defining a binary number and further adapted to produce a start signal at regular time intervals of sufficient duration to include a plurality of cycles of said current, a count-down counter comprising a plurality of serially connected flip-flops, means responsive to the start signal to connect the flip-flops respectively to the computer output signals thereby to set the counter to said number, an OR gate, each flip-flop having an output to said OR gate, means responsive to the start signal to set the latter outputs in accordance with the flip-flop inputs, an AND gate having an input from the OR gate and a second input from the source of alternating current thereby to produce a cyclic output for so long as one of the flip-flops has an output, the AND gate having an output connected to the flip-flop defining the least significant digit of the counter to cause the counter to count down in response to the cyclic AND gate output and thereby disconnect the source from the control winding when the count is zero, an induction motor having a control winding connected to be energized by the AND gate output and having rotor rotatable by such energization at a speed determined by the length of the count within any one of said time intervals, wherein the time intervals are sufficiently short and the length of said count as determined by said number is sufficiently large in relation to the inertia of the rotor so that in operation the rotor rotates continuously and the speed of the motor is variable by variation of said number.

4. The combination as claimed in claim 3 including a frequency-doubling means connected between said source and the input thereof to the AND gate.

5. In combination, an induction motor including rotor and stator having a control winding, a source of alternating current, means for repeatedly generating a start signal at time intervals including a plurality of cycles of the alternating current, means for generating signals defining numbers which are smaller than the total number of said cycles per one said interval, a count-down counter having digit defining elements selectively settable to given numbers, means responsive to a cyclic signal for operating the counter, means responsive to the start signal for connecting the counter to the number-generating means for the counter to be set to the generated number, means responsive to the start signal for connecting said source to the control winding, means responsive to the start signal for establishing connection between said source and the counter operating means for the counter to be operated by the cyclic signals defined by the alternating current, means responsive to the digit-defining elements of the counter defining zero for disestablishing said connection; the number to which the counter is set and the repetition rate of the start signal both being sufficiently high in relation to the inertia of the rotor so that in operation the motor is rotated continuously by successive settings of the counter, and the speed of the motor being variable by variation of the number to which the counter is set.

6. In combination, an induction motor including a rotor and a stator having a control winding a source of alternating current, means for repeatedly generating a start signal at time intervals including a plurality of cycles of the alternating current, means for generating signals defining numbers which are smaller than the total number of said cycles per one said interval, a count-down counter having digit-defining elements selectively settable to given numbers, means responsive to a cyclic signal for operating the counter, means responsive to the start signal for connecting the counter to the number-generating means for the counter to be set to the generated number, means responsive to the digit-defining elements of the counter defining a number greater than zero for establishing connection between said source and the control winding of the motor and for disestablishing such connection when said elements define zero, means also responsive to the digit-defining element of the counter defining a number greater than zero for connecting said source to the counter operating means for the latter to be operated by the cyclic signals defined by the alternating current; the number to which the counter is set and the repetition rate of the start signal both being sufficiently high in relation to the inertia of the rotor so that in operation the motor is rotated continuously by successive settings of the counter, and the speed of the motor being variable by variation of the number to which the counter is set.

* * * * *